United States Patent [19]

Unsworth et al.

[11] Patent Number: 5,548,197
[45] Date of Patent: Aug. 20, 1996

[54] METHOD AND APPARATUS FOR DETERMINING MOTOR SPEED USING ZERO CROSSING TIMES

[75] Inventors: Peter J. Unsworth, Lewis, England; Yuan Wang, Shanghai, China

[73] Assignee: Allen-Bradley Company, Inc., Milwaukee, Wis.

[21] Appl. No.: 314,019

[22] Filed: Sep. 28, 1994

[51] Int. Cl.⁶ .................................................. H02P 3/18
[52] U.S. Cl. ........................ 318/757; 318/729; 318/772; 318/759
[58] Field of Search ..................................... 318/138, 245, 318/254, 700–818

[56] References Cited

U.S. PATENT DOCUMENTS

| | | | |
|---|---|---|---|
| 4,743,815 | 5/1988 | Gee et al. | 318/254 |
| 4,862,052 | 8/1989 | Unsworth et al. | 318/757 |
| 4,916,370 | 4/1990 | Rowan et al. | 318/757 |
| 4,978,897 | 12/1990 | Merrison et al. | 318/268 |
| 4,996,469 | 2/1991 | DeLange et al. | 318/757 |
| 4,996,470 | 2/1991 | Rowan et al. | 318/772 |
| 5,003,241 | 3/1991 | Rowan et al. | 318/761 |
| 5,151,642 | 9/1992 | Lombardi et al. | 318/779 |
| 5,187,419 | 2/1993 | Delange | 318/805 |
| 5,397,971 | 3/1995 | McAllister et al. | 318/254 |
| 5,397,972 | 3/1995 | Maiocchi | 318/439 |
| 5,422,570 | 6/1995 | Moreira | 388/800 |

*Primary Examiner*—Paul Ip
*Attorney, Agent, or Firm*—Michael A. Jaskolski; John M. Miller; John J. Horn

[57] ABSTRACT

A method and apparatus to be used with a motor controller for determining the speed of the motor rotor using current zero crossing times of the stator winding currents. An error signal set, consisting of phase angle errors between consecutive zero crossings over a sampling period, is generated and analyzed in a region of interest in either the time or frequency domain, producing a signal frequency, the signal frequency being the frequency of the motor rotor.

15 Claims, 5 Drawing Sheets

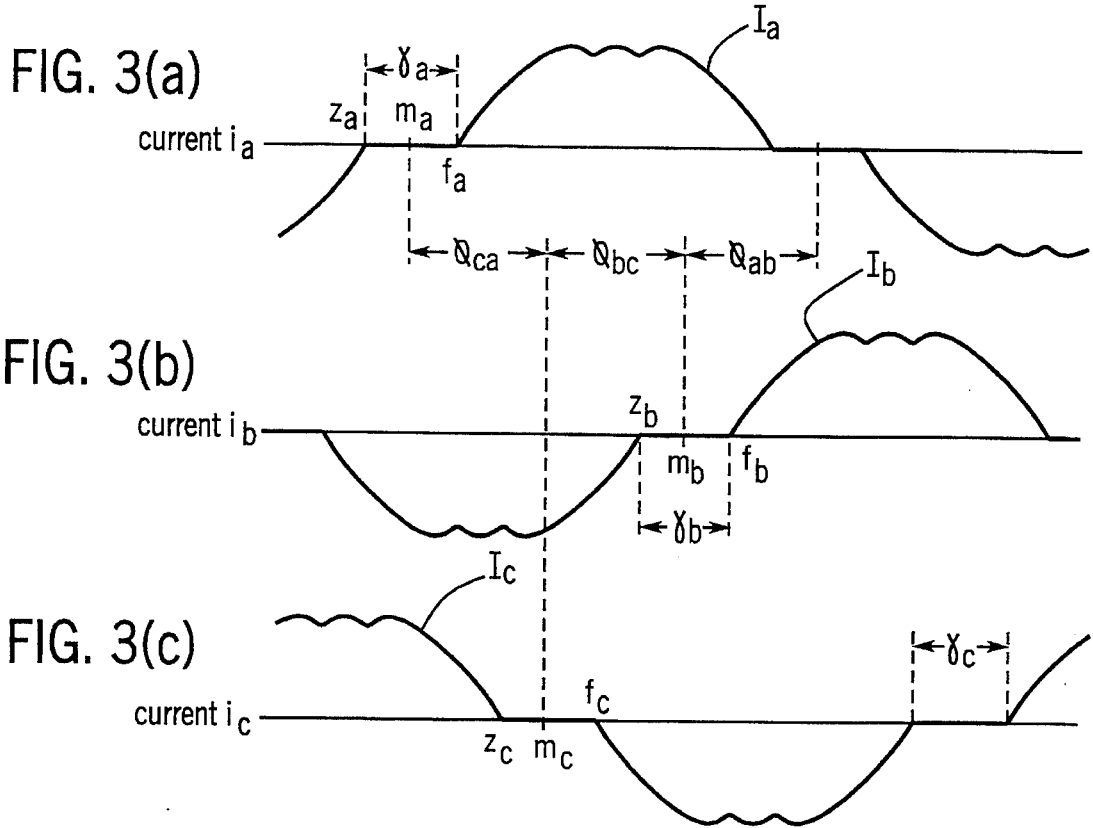
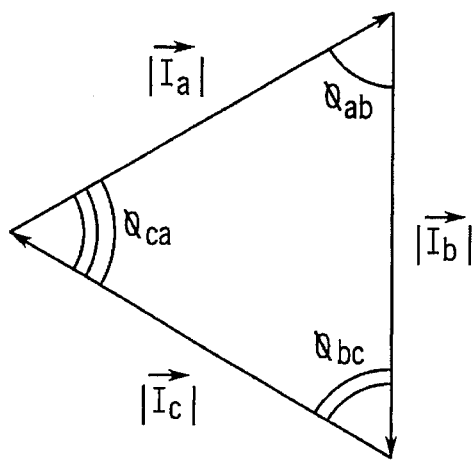
FIG. 4

METHOD AND APPARATUS FOR DETERMINING MOTOR SPEED USING ZERO CROSSING TIMES

BACKGROUND OF THE INVENTION

1. Field of the Invention

The present invention relates to techniques for detecting the speed of an electric motor and particularly to techniques which utilize current zero crossing times of stator currents to determine motor speed.

2. Description of the Art

Many motor applications require motor controllers that can sense motor speed precisely. To sense motor speed, many controllers employ tachometers or other electromechanical devices to produce an electrical signal indicative of motor speed. In addition to being an additional initial motor cost, the accuracy of these devices can deteriorate over time thus requiring either periodic maintenance or eventual replacement.

Many present day motor controllers incorporate a microprocessor. Thus it would be desirable to use the computational ability of the microprocessor to determine motor speed, rather than adding an electromechanical speed detection device.

SUMMARY OF THE INVENTION

The present invention is a method for determining the speed of an electric motor by observing the current zero crossing times of stator currents. The method is to be used with a motor controller which provides stator winding currents at a frequency of X hertz and indicates zero crossing times when each current is zero. The controller also provides a sampling period. The motor has p poles. The method comprises the steps of generating a plurality of error signals over the sampling period, each error signal indicating the time interval between consecutive current zero crossings. The variation of the error signals with time may be transformed and expressed as an error signal frequency spectrum. The error signal spectrum may be used to determine a rotor component having a signal frequency within a region of interest, the region of interest being frequencies between $K((2X/p)-n)$ and $K(2X/p)$ Hz, wherein n is less than $$\frac{2x}{p},$$

K is an integer, and the signal frequency is the frequency of the motor rotor.

Therefore, it is one object of the invention to produce a method by which a conventional motor controller can determine rotor speed using information already known to the controller. Most smart motor controllers already measure current zero crossing times to monitor and control motor parameters other than speed, and thus, no additional hardware is needed to determine motor speed. Furthermore, no additional measurements are needed to determine motor speed.

Another object of the invention is to take advantage of a newly realized relationship between rotor speed and stator current zero crossing information. It has been realized that a small back EMF in the stator caused by the rotor produces a periodic distortion in the stator current thus periodically effecting the current zero crossings. As the rotor frequency is slightly less than the stator current frequency in an induction motor due to slip, the approximate rotor frequency is known. Thus, by generating an error signal spectrum representative of the periodic fluctuation between consecutive current zero crossings, and then distilling a rotor component within the approximate rotor frequency range, the rotor frequency can be ascertained.

The step of generating a plurality of error signals may include the steps of receiving consecutive zero crossing times, subtracting each zero crossing time from a previous consecutive zero crossing time to produce a plurality of difference values, and subtracting ⅙th of the supply period from each difference value to produce the plurality of error signals which will vary about zero.

The step of analyzing the error signal spectrum may include the steps of performing a fast Fourier transform on the error signal spectrum to produce an FFT spectrum and examining the FFT spectrum within the frequency region of interest to determine the frequency of the rotor component within that region. Thus, the rotor frequency can be observed by analyzing the error signal spectrum in the frequency domain. This method is ideal where motor speed must be determined only periodically as zero crossing data values must be collected for times of the order of seconds in order to produce a frequency having the necessary resolution for motor control purposes using the FFT approach.

In a preferred method, the step of analyzing the error signal spectrum includes the steps of passing the error signal spectrum through a band pass filter passing a range of signals having frequencies in the region of interest, to produce a rotor component, and determining the signal frequency of the emergent rotor component, said signal frequency being the motor rotor frequency.

Thus, another object of the invention is to have a speed measurement system which allows real time speed measurement. By incorporating a digital filter which passes a rotor component of the error signal spectrum that is in the limited frequency region of interest, the frequency of the rotor can be observed in the time domain as opposed to the frequency domain.

The method of the present invention is particularly useful where p is 4, X is 60, n is 3, K is 1, and the predetermined period is approximately one second. The method may also included the step of displaying the frequency of the motor rotor.

In addition, the method may update the error signal spectrum continuously at every new current zero crossing provided by the motor to include error signals over the predetermined period and the signal frequency may be provided as a moving average.

The present invention also includes an apparatus to be used with the above described method and motor controller. The apparatus includes a period calculator which receives consecutive zero crossing times from the motor controller over the sampling period, subtracts each zero crossing time from a previous consecutive zero crossing time to produce a plurality of difference values, and subtracts ⅙th of the stator period from each difference value to produce a plurality of error signals indicating the variations in the interval between consecutive current zero crossings, from which an error signal spectrum may be generated. The apparatus also includes a frequency analyzer which analyzes the error signal spectrum to determine the frequency of a signal frequency, the signal frequency being the frequency of the dominant harmonic component of the error signal spectrum within a region of interest, said region of interest having a frequency of $K((2X/p)-n)$ and $K(2X/p)$ Hz, wherein n is less than X/6 and the signal frequency is the frequency of the motor rotor.

In a preferred apparatus a frequency analyzer includes a bandpass filter passing signals having frequencies within the region of interest, the filter receiving the error signal spectrum and producing a rotor component within said bandpass, and a frequency indicator which determines the signal frequency of the rotor component, said signal frequency being the motor rotor speed.

Also, in the preferred apparatus the error signal spectrum is continuously updated at every new current zero crossing provided by the motor to include error signals over the predetermined period and the signal frequency provided is a moving average.

In addition, the present invention includes a method to be used with a motor controller where the controller provides stator winding currents at the mains supply frequency of 60 Hz and indicates zero crossing times when each current reaches zero, the controller also collecting data over a sampling period of approximately one second.

The method comprises the steps of receiving consecutive zero crossing times from the motor controller, subtracting each zero crossing time from a previous consecutive zero crossing time to produce a plurality of difference values, subtracting ⅙th of the supply period from each difference value to produce a plurality of error signals, the error signals together having an error signal frequency spectrum, passing the error signals through a bandpass filter having a bandpass between 27.0 and 30.0 Hz (which is the normal operating speed range of the motor) to produce a rotor component having a frequency within said bandpass, determining a signal frequency of the rotor component, said signal frequency being the rotor speed and displaying the signal frequency.

This patent describes a novel method and apparatus for determining motor rotor speed using current zero crossing information which standard motor controllers already monitor for other motor control purposes.

Other and further aspects of the present invention will become apparent during the course of the following description and by reference to the accompanying drawings.

BRIEF DESCRIPTION OF THE DRAWINGS

FIGS. 3(a), 3(b) and 3(c) are graphs illustrating the currents through the three supply lines in FIG. 1 as a function of time;

FIG. 4 is a vector diagram showing the geometric relationship between currents and phase angles in a three phase motor;

DETAILED DESCRIPTION OF THE PREFERRED EMBODIMENTS

Figure 1:
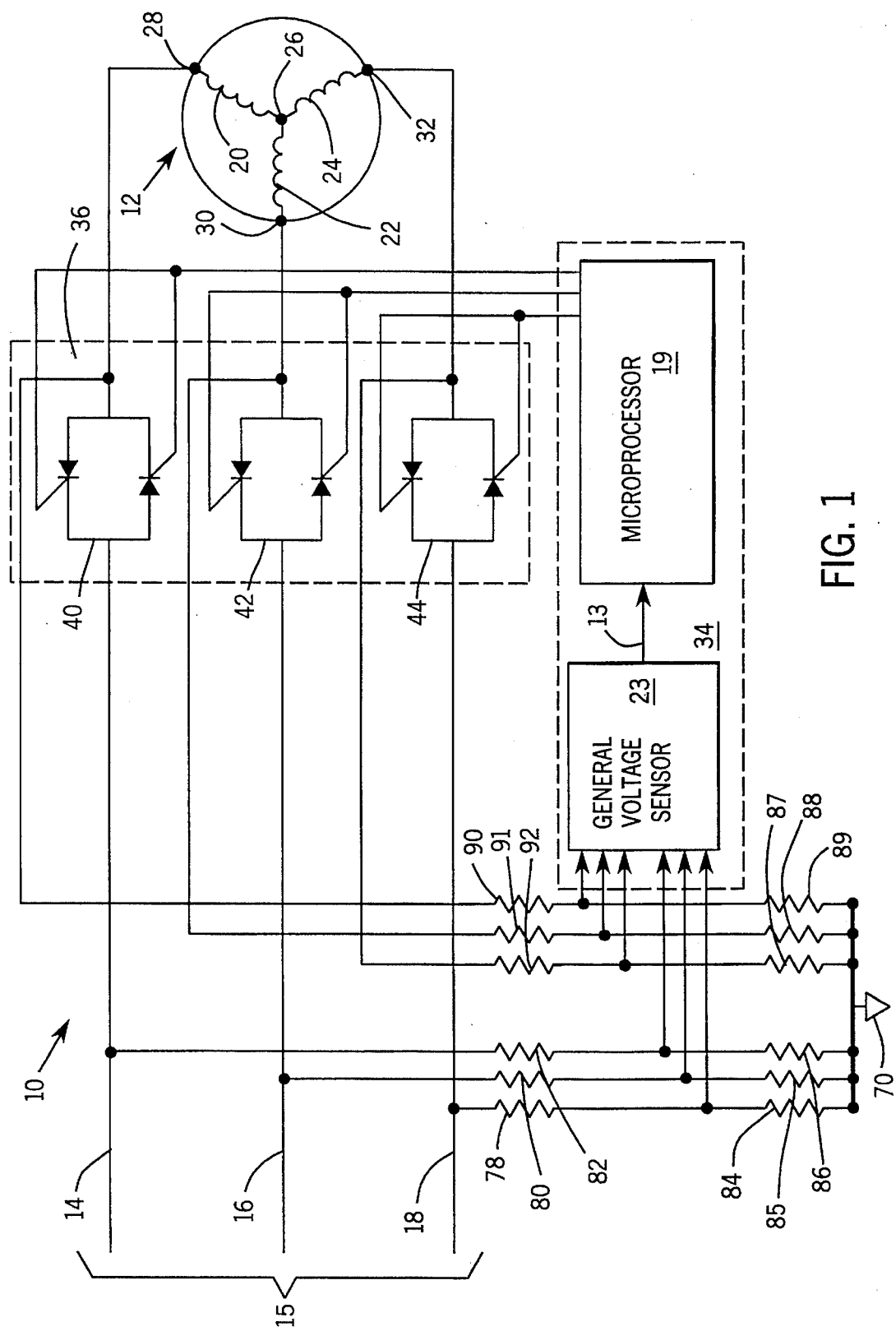
FIG. 1 is a schematic diagram of a motor and a controller which incorporates the present invention.

The present invention will be described in the context of the exemplary motor control system 10 shown in FIG. 1. The control system 10 detects zero crossing times on each of three stator windings 20, 22, and 24 in a manner to be described below, and uses that information to determine the speed of the motor rotor.

The induction motor 12 has three stator windings 20, 22, 24 which are coupled in a Y-configuration at neutral node 26. The distal end of each stator winding 20, 22, or 24 is connected to a supply line 14, 16, or 18 at a motor terminal 28, 30, or 32 respectively. The phase of the voltage on supply line 14 leads the phase of the voltage on supply line 16 which in turn leads the phase voltage on supply line 18.

The motor control system 10 consists of a control module 34, a thyristor switch module 36, and a plurality of other components which will be described in more detail below. Within the control module 34, there is an SCR voltage sensor 23 which feeds current zero crossing information to a microprocessor 19.

The thyristor switch module 36 has three separate thyristor switches 40, 42, 44. Each thyristor switch 40, 42, 44 consists of a pair of inversely connected silicon controlled rectifiers (SCR's). Each thyristor switch 40, 42, 44 is used to control the voltage on, and current through, an associated supply line 14, 16 or 18 for altering current supplied to, and voltage across the terminals of the motor 12.

Figure 2A:
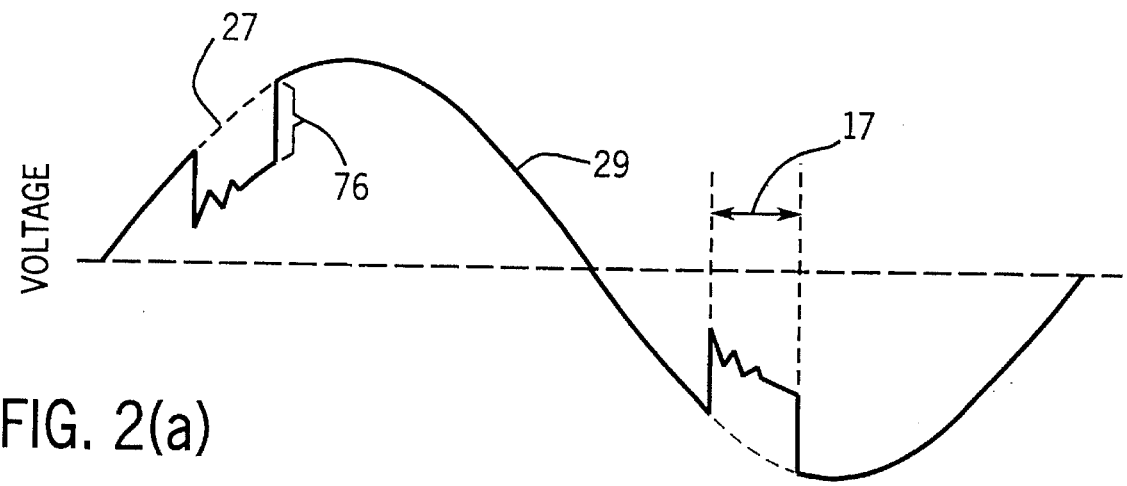
FIGS. 2(a) and 2(b) are graphs illustrating the voltage across and current through a pair of SCR's in FIG. 1 as a function of time.
Figure 2B:
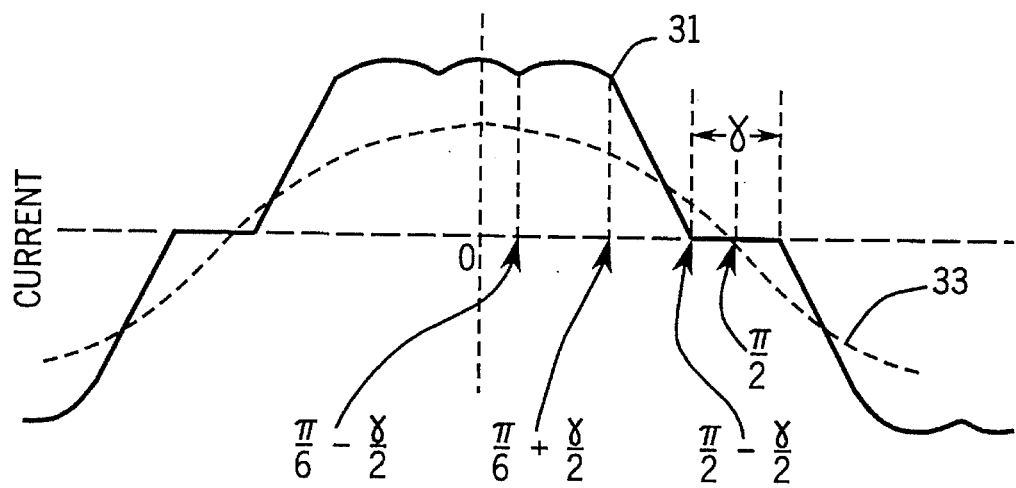

Referring also to FIGS. 2(a) and 2(b), the current and voltage on a single supply line 14, 16 or 18 may be compared to the current and voltage of the AC source 15. In FIG. 2(a), the supply voltage 27 is sinusoidal. The terminal voltage 29 is generally identical to the supply voltage 27, except for during a small non-conducting time, or notch 17 having a duration of γ, which is introduced into each half cycle of supply voltage 27. The notch 17 is introduced into the supply voltage 27 each time an associated line current 31 reaches zero, which causes the thyristor conducting the current to stop conducting. The line current 31 remains zero until the end of the notch 17, at which time the current 31 continues a pulsating waveform having a fundamental sinusoidal component 33 which generally lags the terminal voltage 29 by the angle of the power factor of the motor. The fundamental component of the line current reaches zero in the middle of notch 17.

The control system 10 used with the present invention alters RMS supply line current by controlling the period of notch 17. During the duration γ, the thyristor pair comprising one thyristor switch 40, 42 or 44 and connecting one stator winding 20, 22 or 24 to the voltage source operates as an open circuit, so that, instead of observing the sinusoidal supply voltage at the terminal 28, 30 or 32, an internally generated motor back EMF voltage 76 may be seen. This gives the notch 17 in the observed waveform at the terminal 28, 30 or 32.

In order to understand how the control module 34 determines motor rotor speed, it is necessary to understand the relationships between voltages, currents and phase angles in a three phase system. Referring to FIGS. 3(a), 3(b) and 3(c), the three curves represent line currents $I_a$, $I_b$ and $I_c$ corresponding to voltages $V_a$, $V_b$ and $V_c$ on the supply lines 14, 16, 18 respectively. For an induction motor with symmetrical windings and a balanced three phase supply voltage, $$\vec{V}_a + \vec{V}_b + \vec{V}_c = 0; \qquad (1)$$

$$|\vec{V}_a| = |\vec{V}_b| = |\vec{V}_c|; \qquad (2)$$

$$|\vec{I}_a| = |\vec{I}_b| = |\vec{I}_c|; \qquad (3)$$

$$\vec{I}_a + \vec{I}_b + \vec{I}_c = 0; \qquad (4)$$

and, $$\phi_{ab} = \phi_{bc} = \phi_{ca} = 60° \qquad (5)$$

where $\phi_{ab}$, $\phi_{bc}$, $\phi_{ca}$ are the phase angles between the zero crossing points for the fundamental components of the three phase currents $I_a$, $I_b$ and $I_c$.

Referring also to FIG. 4, because of the relationships between currents $I_a$, $I_b$ and $I_c$ and their associated phase angles $\phi_{ab}$, $\phi_{bc}$ and $\phi_{ca}$ expressed in Equations 3, 4 and 5, these currents and angles can be represented by a triangle where the sides correspond to current magnitudes $|\vec{I}_a|$, $|\vec{I}_b|$ and $|\vec{I}_c|$ the angles correspond to phase angles $\phi_{ab}$, $\phi_{bc}$ and $\phi_{ca}$. Using well known geometric theorems, the relationships between the current magnitudes and phase angles in FIG. 4 can be represented as:

$$\frac{|\vec{I}_a|}{\sin(\phi_{bc})} = \frac{|\vec{I}_b|}{\sin(\phi_{ca})} = \frac{|\vec{I}_c|}{\sin(\phi_{ab})} = G \qquad (6)$$

where G is a constant. Solving Equation 6 for $|\vec{I}_a|$, $|\vec{I}_b|$ and $|\vec{I}_c|$:

$$|\vec{I}_a| = G * \sin(\phi_{bc}) \qquad (7)$$

$$|\vec{I}_b| = G * \sin(\phi_{ca}) \qquad (8)$$

$$|\vec{I}_c| = G * \sin(\phi_{ab}). \qquad (9)$$

It can be seen from Equations 7, 8 and 9 that the amplitudes of the currents $I_a$, $I_b$ and $I_c$ are proportional to the phase angles $\phi_{bc}$, $\phi_{ca}$ and $\phi_{ab}$ respectively.

Therefore, when all the phase angles $\phi_{bc}$, $\phi_{ca}$ and $\phi_{ab}$ are equal to 60°, $|\vec{I}_a|$, $|\vec{I}_b|$ and $|\vec{I}_c|$ are equal and the system is balanced.

When any phase angle $\phi_{bc}$, $\phi_{ca}$ or $\phi_{ab}$ is not equal to 60°, the system is unbalanced. Thus, by determining the phase angles $\phi_{bc}$, $\phi_{ca}$ and $\phi_{ab}$, information concerning unbalance can be obtained.

Referring again to FIGS. 3(a), 3(b) and 3(c), points $z_a$, $z_b$, and $z_c$ are the instances when currents reach zero. Points $f_a$, $f_b$, and $f_c$ are the firing times of the thyristor switches 40, 42, 44. The notches $\gamma_a$, $\gamma_b$ and $\gamma_c$ are the intervals between associated z and f points. Since the fundamental component of line current mainly determines the operating performance of an induction motor, the phase angles $\phi_{ab}$, $\phi_{bc}$ and $\phi_{ca}$ between the three phase fundamental current components are of particular interest. In FIGS. 3(a), 3(b), and 3(c), $m_a$, $m_b$ and $m_c$ represent the zero crossing points for the fundamental component of each line current $I_a$, $I_b$ and $I_c$ and are the midpoints between associated z and f points.

Referring again to FIG. 1, most motor controllers 34 directly monitor the voltage across the thyristors 40, 42, 44. In FIG. 1, each supply line 14, 16 or 18 is coupled by a separate resistor 78, 80 or 82 to the inputs of the SCR voltage sensor 23. Resistors 90, 91 and 92 couple motor terminals 28, 30 and 32 to inputs of the SCR voltage sensor 23.

Six additional resistors 84–89, couple the inputs of the SCR voltage sensor 23 to a control circuit ground 70, thereby forming voltage dividers with resistors 78, 80, 82, 90, 91, and 92. The SCR voltage sensor 23 determines the times at which each thyristor 40, 42, 44 is conducting and effectively short circuited. At the times $z_a$, $z_b$, $z_c$, the current in an associated line 14, 16, or 18 crosses zero and the voltage 29 at a motor terminal 28, 35, or 32 changes abruptly. This change is detected by the SCR voltage sensor 23 so that at each zero crossing $z_a$, $z_b$, or $z_c$, it sends a signal to the microprocessor 19 along line 13.

Figure 5:
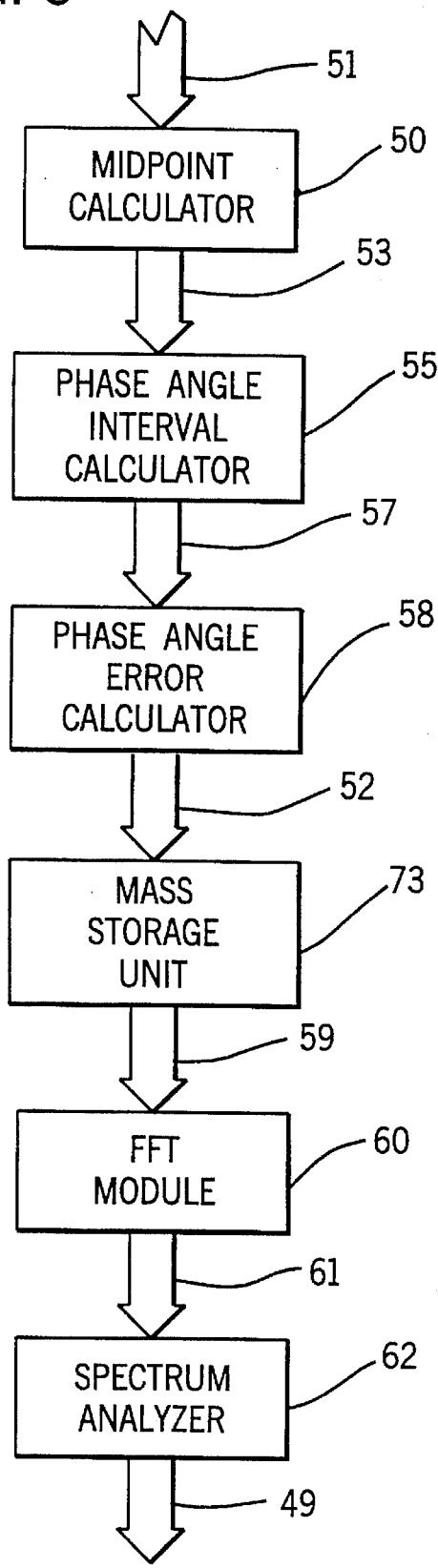
FIG. 5 is a flow chart depicting the operation of one embodiment of the control signal module which takes notch and zero crossing information and determines the speed of the rotor.

Referring now to FIG. 5, the microprocessor 19 carries out a number of different functions which are incorporated in computer code. It should be understood that while these functions are described as being implemented in software, they could be implemented in discrete solid state hardware as well, or part in hardware and part in software.

As the microprocessor 19 controls the thyristors 40, 42, and 44, the microprocessor 19 can identify notch durations $\gamma_a$, $\gamma_b$ and $\gamma_c$. The microprocessor 19 includes a midpoint calculator 50 which receives both zero crossing $z_a$, $z_b$, $z_c$ and notch duration $\gamma_a$, $\gamma_b$, $\gamma_c$ information 51. With this information, the midpoint calculator 50 determines midpoints $m_a$, $m_b$ and $m_c$ according to the following equations:

$$m_a = z_a + \frac{\gamma_a}{2}: \qquad (10)$$

$$m_b = z_b + \frac{\gamma_b}{2}: \text{ and} \qquad (11)$$

$$m_c = z_c + \frac{\gamma_c}{2}. \qquad (12)$$

As indicated above, these midpoints $m_a$, $m_b$ and $m_c$ are the zero crossing points of the fundamental components of the line currents.

A set of signals of a magnitude easily useable for signal processing, representing the difference between midpoints $m_a$, $m_b$ and $m_c$ must be derived. To accomplish this task, the midpoints $m_a$, $m_b$ and $m_c$, 53, are provided to a phase angle interval calculator 55 which determines the phase angles $\phi_{ab}$, $\phi_{bc}$ and $\phi_{ca}$, 57 between consecutive midpoints $m_a$, $m_b$ and $m_c$ according to the following equations:

$$\phi_{ab} = m_b - m_a; \qquad (13)$$

$$\phi_{bc} = m_c - m_b; \text{ and} \qquad (14)$$

$$\phi_{ca} = m_a - m_c. \qquad (15)$$

Next, a phase angle error calculator 58 receives phase angles $\phi_{ab}$, $\phi_{bc}$ and $\phi_{ca}$, 57, and subtracts ⅙th of a stator period, or $\tau$ (60° in the preferred embodiment), from each phase angle $\phi_{ab}$, $\phi_{bc}$ and $\phi_{ca}$ according to the following equations:

$$\zeta_{bc} = \phi_{bc} - \tau; \qquad (16)$$

$$\zeta_{ca} = \phi_{ca} - \tau; \text{ and} \qquad (17)$$

$$\zeta_{ab} = \phi_{ab} - \tau. \qquad (18)$$

to produce phase angle errors $\zeta_{ab}$, $\zeta_{bc}$ and $\zeta_{ca}$, 52. Preferably, a series of phase angle errors 52 is calculated over a period of approximately one second. In a preferred embodiment, operating at 60 Hz, calculations over approximately one second would yield 360 measured values of phase angle errors 52. All of the phase angle errors 52 are stored for processing in a mass storage unit 73. In an ideal balanced motor fed from an ideally balanced mains supply, the phase errors 52 would all be zero. However, every source of unbalance, whether it be in the stator, the rotor, the supply, or some environmental source, effects the intervals between successive current zero crossings and thus are reflected in the values of the recorded error signals 59 stored in the storage unit 73. Some of the sources of unbalance are erratic while others are periodic. Importantly, asymmetrical rotor windings act as a source of substantially periodic variations in the errors signals 52 varying at the rotor speed frequency.

As a rotor rotates, current therein produces a rotor magnetic field directed radially outward toward the stator. Just as the stator magnetic field induces a voltage in the rotor windings, so the rotor magnetic field induces a voltage, or back EMF, in the stator windings. Where rotor windings or the rotor magnetic core are slightly asymmetrical, the stator back EMF is unbalanced and the stator currents are affected to show small variations dependent on the rotor unbalance and speed.

The variations in stator current show up in the error signals 59 as a series of phase angle deviations. The frequency spectrum 61 of the phase angle deviations includes a component which may be extracted where the frequency is identical to the frequency (speed) of the rotor.

By determining the frequency of the rotor component, the rotor speed can be determined.

For a p-pole motor operating at X cycles per second, the rotor frequency will be within a region of interest between $K((2X/p)-n)$ and $K(2X/p)$ Hz, where n is a number chosen by the controller designer usually on the order of 1, 2, or 3, but not necessarily an integer, and K is an integer. K need not be included in calculating the region of interest. K merely indicates that the effects of a periodic distortion in stator current often show up at multiples of their lowest frequency.

Thus, for a motor having 4 poles and driven with an alternating stator current at 60 Hz and an n value of 3 Hz, the error signal spectrum 59 should be evaluated to find a rotor component having a frequency within the region between 27 and 30 Hz. In addition, similar components could be located in regions between 54 and 60 Hz, 81 and 90 Hz . . . (e.g. where K is 2, 3, 4 . . . ).

This disclosure will focus on the lowest region of interest where K is 1, the motor has four poles, and the motor is operating at 60 Hz. Under these circumstances, the stator flux frequency is at 30 Hz while the rotor speed will normally be between 27 and 30 Hz, just a few Hz less than the stator flux rotation frequency. This is because the operation of an induction motor requires some slip s between the rotor speed of the stator field and the rotor conductors (i.e. current is only induced in the rotor conductors if the conductors are in a changing magnetic field) to operate properly.

The frequency of the rotor speed component of the error signals 59 can be determined in one of two ways. Referring to FIG. 5, one way is to input the error signal spectrum 59 to an FFT module 60 which produces a FFT frequency spectrum 61. A spectrum analyzer 62 can locate the rotor component of the FFT frequency spectrum at a rotor component frequency 49 just below the stator flux frequency within the range of 27-30 Hz.

The frequency resolution of an FFT spectrum depends on the sampling period over which data is collected. Thus, if a frequency resolution of 0.1 Hz is desired, the phase angle errors 52 must be collected over a 10 second period (i.e. the frequency resolution is 1/T where T is the period over which samples are collected).

Unfortunately, this type of speed analysis is not suitable for rapid real time on-line speed determination. In addition, if motor speed varies during the sampling period, the spectral peaks from a FFT spectrum 61 smear out and thus are more difficult to read accurately. In many applications, speed determination must be instantaneous and thus, this first method of determining the degree of unbalance at the rotor frequency is not very useful.

Figure 6A:
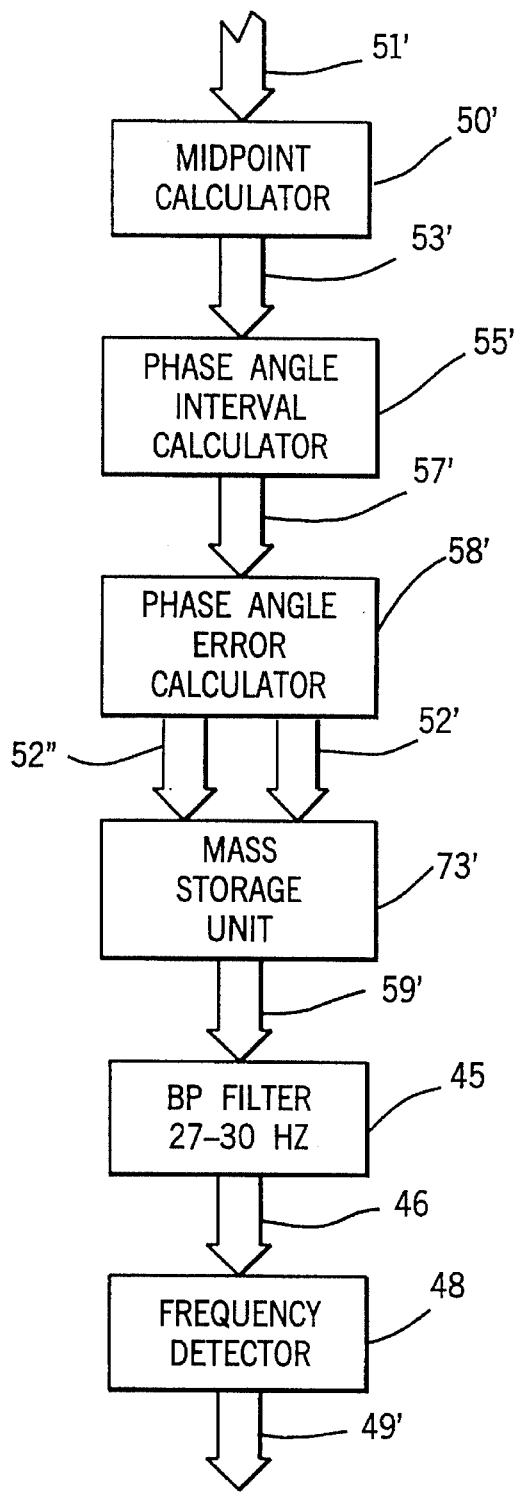
FIG. 6 is a flow chart depicting the operation of a second embodiment of the control signal module which determines the speed of the rotor.
Figure 6B:
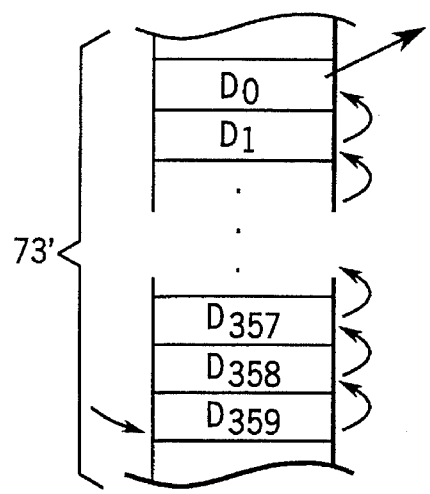

The second way to determine the frequency of the rotor component of the error signal spectrum 59 overcomes the practical problems of the first. Referring to FIG. 6, the midpoint calculator 50', phase angle interval calculator 55', and phase angle error calculator 58' operate in the manner explained when referring to FIG. 5 above. In a preferred embodiment 360 error signals 52' are stored in 360 memory locations D0–D359 in the mass data storage unit 73'.

In FIG. 6, instead of observing the rotor frequency in the frequency domain, the error signals 59' stored in the mass data storage unit 73' can be imputed to a 27–30 Hz bandpass filter 45 which passes the rotor component of the error signal spectrum having a frequency between 27–30 Hz. In the preferred embodiment the band pass filter would be a 7-stage cascaded second order Butterworth digital band pass filter with band pass frequencies range from 27–30 Hz. The rotor component 46 which is passed should be at the rotor frequency and can be observed in the time domain.

The rotor signal 46 is received by a frequency detector 48 which determines the signal frequency 49' of the rotor component 46 by measuring the time between an integral number of zero crossings of the rotor signal 46. The signal frequency 49' is the rotor frequency and can be quantified in any manner known in the art and displayed for an operator to view. The signal frequency 49' may also be provided to other parts of the microprocessor 19 for other motor control functions such as displaying the motor speed, or calculating the load on the motor from the slowing the frequency of the rotor, or for slowing or stopping of the motor in a controlled manner.

Referring still to FIG. 6, in order to provide an instantaneous real time rotor frequency, the error signals 59' stored in the mass data storage unit 73' can be updated regularly each time a stator current crosses zero. After the first error signal set 59' is stored and while filter 45 is determining the first periodic signal 46, the midpoint calculator 50', phase angle interval calculator 55' and phase angle error calculator 58' process the next phase angle error 52" based on the most recent stator current zero crossing.

At this time the phase angle errors 52' in memory locations D0–D359 are each shifted back one memory location and the phase angle error 52' in the D0 location is discarded. The next phase angle error 52" is stored in freed memory location D359 and completes an updated error signal set 59'. When the filter 45 produces a new periodic signal 46 and ultimately, the frequency filter 48 produces a new signal frequency 49' using the updated error signal spectrum 59', the new signal frequency will be an updated real time determination of rotor speed.

Thus, after the first error signal spectrum 59' is stored, the midpoint calculator 50' provides only one new midpoint 53' each time a stator current crosses zero. Similarly, after the first error signal set 59' is stored, the phase angle interval calculator 55' and the phase angle error calculator 58' only produce one new value for each new zero crossing. In this manner, the rotor frequency can be provided as a moving average while phase angle errors are being calculated.

Importantly, in the time domain the degree of unbalance can be accurately observed by sampling over a period of approximately 1 second, rather than the 10 seconds that are needed in the frequency domain. In addition, because the rotor frequency can be provided as a moving average over approximately one second when calculated in the time domain, the rotor frequency can be provided on a real time basis which is necessary in many motor control applications. A related advantage is that the inaccuracy of the calculations which results from the smearing out of the rotor frequency in the frequency domain due to rotor frequency fluctuations, is less because sampling takes place over a more limited time period, and because the time domain signal 46 more directly reflects the speed of the rotor.

The present invention also includes a method for determining rotor frequency in AC motors. In a preferred method, a motor controller provides stator winding currents at a frequency of 60 Hz and indicates zero crossing times when each current reaches zero. The controller also indicates a sampling period of approximately one second and the motor has 4 poles. The method comprises the steps of receiving consecutive zero crossing times from the motor controller, subtracting each zero crossing time from a previous consecutive zero crossing time to produce a plurality of difference values, subtracting ⅙th of the stator period from each difference value to produce a plurality of error passing the error signals through a bandpass filter having a bandpass between 27.0 and 30.0 Hz to produce a rotor component, determining a signal frequency of the rotor component, said signal frequency being the motor rotor speed, and displaying the motor rotor frequency. Preferably, the rotor frequency is continuously updated at every new current zero crossing provided by the motor to incorporate error signals over the predetermined period and the frequency of the rotor is provided as a moving average.

It should be understood that the above described embodiments are simply illustrative of the principles of this invention. Various other modifications and changes may be made by those skilled in the art which will embody the principals of the invention and fall within the spirit and scope thereof. For example, while the signal frequency 49 can be found using both an FFT and a band pass filter, and the moving average is only discussed with respect to the band pass filter manner of finding the signal frequency, the moving average could also be used with the FFT analysis.

In addition, while the embodiments suggest certain periods over which samples might be taken, any period might be used over which different frequency components could be derived. Thus, under certain circumstances, a period of even a fraction of a second might be used for sampling purposes. Also, while certain frequency regions of interest have been disclosed, other regions of interest could be analyzed to determine the speed of the motor over a range wider than 27 to 30 Hz, by incorporating separate, or variable or switched band pass filters to cover other regions of the frequency range down to zero, or above 30 Hz.

Furthermore, the method and apparatus of the present invention could be used with any type of motor, independent of pole and winding design, and independent of the frequency at which the motor operates. In order to appraise the public of the many embodiments that may fall within the scope of the invention, the following claims are made.

We claim:

1. A method to be used with a motor controller, the motor controller providing stator winding currents at a frequency of X Hz and indicating zero crossing times when each current is zero, the controller also providing a sampling period, the motor being of a design having p poles, the method determining the speed of a motor rotor, the method comprising the steps of:

generating a plurality of error signals over the sampling period, each error signal indicating the deviation of consecutive current zero crossings from a constant interval, the plurality of error signals together forming an error signal sequence; and analyzing the error signal sequence to determine an error signal sequence spectrum, a region of interest within said spectrum comprising a back emf signal generated by said rotor.

2. The method as recited in claim 1 wherein the controller also provides a stator period and the step of generating a plurality of error signals includes the steps of:

receiving consecutive zero crossing times;

subtracting each zero crossing time from a previous consecutive zero crossing time to produce a plurality of difference values; and subtracting ⅙th of the stator period from each difference value to produce the plurality of error signals.

3. The method as recited in claim 1 wherein the step of analyzing the error signal sequence includes the steps of passing the error signal sequence through a bandpass filter which passes frequencies within the region of interest, and determining a particular frequency of said back emf signal generated by said rotor.

4. The method as recited in claim 1 wherein the step of analyzing the error signal sequence includes the steps of performing a fast Fourier transform on said error signal sequence to product an FFT spectrum and examining said FFT spectrum within the region of interest to find the particular frequency of said back emf signal generated by said rotor.

5. The method as recited in claim 1 further including the step of displaying the signal frequency and providing the signal frequency to the controller for use in other motor control operations.

6. The method as recited in claim 1 wherein the error signal sequence is continuously updated at every new current zero crossing provided by the motor to include error signals over the predetermined period and the frequency of the back emf signal is a moving average.

7. The method as recited in claim 1 wherein the region of interest is between $K((2X/p)-n)$ and $K(2X/p)$ Hz, where K is an integer, and the signal frequency is the frequency of the motor rotor.

8. The method as recited in claim 7 wherein p is 4, X is 60 Hz, n is 3 Hz, K is 1, and the sampling period is approximately one second.

9. An apparatus to be used with a motor controller, the motor controller providing stator winding currents at a frequency of X cycles per second and indicating zero crossing times when each current is zero, the controller also indicating a sampling period of time and a stator period, the motor being of a design having p poles, the apparatus for determining the speed of a motor rotor, the apparatus comprising:

a period calculator which receives consecutive zero crossing times from the motor controller over the sampling period, subtracts each zero crossing time from a previous consecutive zero crossing time to produce a plurality of difference values, and subtracts ⅙th of the stator period from each difference value to produce a plurality of error signals indicating the period between consecutive current zero crossings, the error signals together forming an error signal set; and a frequency analyzer which analyzes the error signal set to determine a peak frequency component of said error signal set within a region of interest, the region of interest being between $K((2Xp-n)$ and $K(2X/p)$ Hz;

wherein n is less than $2X/p$, and K is an integer.

10. The apparatus as recited in claim 9 wherein the frequency analyzer includes:

a bandpass filter receiving the error signal set and having a bandpass to pass frequencies within the region of interest; and a frequency indicator which determines the peak frequency component within the region of interest.

11. The apparatus as recited in claim 9 wherein the frequency analyzer includes:

a Fourier module which receives the error signal set and produces an FFT error signal spectrum; and a frequency indicator to examine said FFT spectrum within the region of interest to find the peak frequency component.

12. The apparatus as recited in claim 9 wherein p is 4, X is 60 Hz, n is 3 Hz, K is 1, and the sampling period is approximately one second.

13. The apparatus as recited in claim 9 wherein the error signal spectrum is continuously updated at every new current zero crossing provided by the motor to include error signals over the sampling period and the peak frequency component is a moving average.

14. A method to be used with a motor controller, the motor controller providing stator winding currents at a frequency of 60 Hz and indicating zero crossing times when each current is zero, the controller also indicating a sampling period of approximately one second and a stator period, the motor being of a design having 4 poles, the method determining the speed of a motor rotor, the method comprising the steps of:

receiving consecutive zero crossing times from the motor controller;

subtracting each zero crossing time from a previous consecutive zero crossing time to produce a plurality of difference values;

subtracting ⅙th of the stator period from each difference value to produce a plurality of error signals, the error signals together forming an error signal set;

passing the error signal set through a bandpass filter having a bandpass between 27.0 and 30.0 Hz to produce a rotor component;

determining a signal frequency of the rotor component, said signal frequency being the motor rotor frequency; and displaying the signal frequency.

15. The method as recited in claim 14 wherein the signal frequency is continuously updated at every new current zero crossing provided by the motor to incorporate error signals over the predetermined period and the signal frequency is displayed as a moving average.

* * * * *